(12) United States Patent
Hadley et al.

(10) Patent No.: US 8,683,367 B1
(45) Date of Patent: Mar. 25, 2014

(54) METHOD AND SYSTEM FOR DIFFERENTIATING AMONG A PLURALITY OF DESIGN EXPRESSIONS

(75) Inventors: Brent Louis Hadley, Kent, WA (US);
Patrick J. Eames, Newcastle, WA (US);
Michael Patrick Sciarra, Seattle, WA (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 12/712,160

(22) Filed: Feb. 24, 2010

(51) Int. Cl.
*G06F 3/14* (2006.01)

(52) U.S. Cl.
USPC ............. 715/771; 700/97; 703/1; 709/220; 438/1; 463/1; 235/462.01; 33/527; 345/30

(58) Field of Classification Search
USPC .............. 715/200–277, 700–867; 700/97, 700/701–866; 709/201–229; 705/50–79; 345/30–111; 707/200–206; 703/1; 438/1; 463/31; 33/527; 235/462, 235/462.01

See application file for complete search history.

(56) References Cited

U.S. PATENT DOCUMENTS

| | | | |
|---|---|---|---|
| 6,561,424 B1 * | 5/2003 | Dickson et al. | 235/462.01 |
| 6,678,871 B2 | 1/2004 | Takeyama et al. | |
| 6,847,853 B1 * | 1/2005 | Vinciarelli et al. | 700/97 |
| 6,917,816 B2 | 7/2005 | Abed et al. | |
| 7,143,021 B1 | 11/2006 | McGaughy et al. | |
| 7,145,898 B1 | 12/2006 | Elliott | |
| 7,393,699 B2 * | 7/2008 | Tran | 438/1 |
| 7,617,465 B1 | 11/2009 | Cadouri | |
| 7,853,671 B2 * | 12/2010 | Crolley | 709/220 |
| 2003/0172145 A1 | 9/2003 | Nguyen | |
| 2005/0143966 A1 | 6/2005 | McGaughy | |
| 2005/0149311 A1 | 7/2005 | McGaughy | |
| 2005/0149312 A1 | 7/2005 | McGaughy | |
| 2010/0261526 A1 * | 10/2010 | Anderson et al. | 463/31 |
| 2010/0274536 A1 * | 10/2010 | Okada et al. | 703/1 |
| 2011/0126416 A1 * | 6/2011 | Swanson et al. | 33/527 |

* cited by examiner

Primary Examiner — Ruay Ho

(57) ABSTRACT

A method for differentiating between variations of an apparatus design is provided. The method includes digitally characterizing at least two aspects of a first expression wherein the at least two aspects include at least logical data and physical data relating to the first expression, and digitally characterizing the at least two next aspects of at least one next expression other than the first expression wherein the at least two next aspects include at least logical data and physical data relating to the at least one next design expression. The method further includes identifying selected differences between the at least two aspects and the at least two next aspects and displaying the first expression and at least one of the at least one next expression in a visual display wherein the selected differences are presented using at least one visually identifiable distinction.

12 Claims, 3 Drawing Sheets

METHOD AND SYSTEM FOR DIFFERENTIATING AMONG A PLURALITY OF DESIGN EXPRESSIONS

TECHNICAL FIELD

The present disclosure is directed to system analysis, and especially to differentiating among a plurality of versions or installations of a design expression such as a system or apparatus.

BACKGROUND

In order to design and manufacture complex design expression such systems or apparatuses as, by way of example and not by way of limitation, airplanes, designers may be required to manage an extraordinary amount of complex and overlapping design requirements. By way of further example and not by way of limitation, electrical wiring or hydraulic line designs and layout or routing information may vary from model to model or may vary over time to comply with government requirements such as Federal Aviation Administration (FAA) requirements. Changes may evolve over time so that identifying precise physical and logical representation of the various changes can be difficult.

There is a need for a method and system for differentiating among a plurality of design expressions, such as installations or variations of a system or apparatus to aid visualization by designers of three-dimensional and non-geometric data relating to the system or apparatus to facilitate identifying changes and communicating the changes to parties responsible for installing or using the system or apparatus.

SUMMARY

A method for differentiating among a plurality of design expressions of an apparatus includes: (a) digitally characterizing at least two aspects of a first installation of the plurality of installations; the at least two aspects of the first installation including at least logical data and physical data relating to the design expression; (b) digitally characterizing the at least two aspects of at least one next installation of the plurality of installations; the at least two aspects of the at least one next installation including at least logical data and physical data relating to the design expression; (c) identifying selected differences between the at least two aspects of the first installation and the at least one next installation; and (d) displaying the first installation and at least one of the at least one next installation in a visual display; the selected differences being presented using at least one visually identifiable distinction.

A system for differentiating among a plurality of design expressions of an apparatus includes: (a) at least one data storage unit; the at least one data storage unit storing information digitally characterizing at least two aspects of each respective installation of the plurality of installations; the at least two aspects of each respective installation including logical data and physical data relating to the design expression; (b) at least one processing unit coupled with the at least one data storage unit; the at least one processing unit identifying selected differences between the at least two aspects of a first installation and at least one next installation; and (c) at least one display unit coupled with the at least one processing unit; the at least one display unit presenting the first installation and at least one of the at least one next installation in a visual display; the selected differences being presented using at least one visually identifiable distinction.

It is, therefore, a feature of the present disclosure to provide a method and system for differentiating among a plurality of design expressions, such as installations or variations of a system or apparatus, to aid visualization by designers of three-dimensional and non-geometric data relating to the system or apparatus to facilitate identifying changes and communicating the changes to parties responsible for installing or using the system or apparatus.

Further objects and features of the present disclosure will be apparent from the following specification and claims when considered in connection with the accompanying drawings, in which like elements are labeled using like reference numerals in the various figures, illustrating the preferred embodiments of the disclosure.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicated that two or more elements are in either direct or indirect (with other intervening elements between them) physical or electrical contact with each other, or that the two or more elements co-operate or interact with each other (e.g. as in a cause and effect relationship).

For purposes of this disclosure, the term "design expression", along with its derivatives, may be taken to mean an installation, apparatus, plan, diagram, Computer Aided Design (CAD) or Computer Aided Manufacture (CAM) display, or another manifestation of an arrangement of elements establishing a product or a portion of a product.

A product may be embodied in a system, an apparatus or another expression. By way of example and not by way of limitation, a system may evolve from a logical expression (e.g., design requirements) to an eventual Three-Dimensional (3D) physical design or embodiment. The present disclosure may distinguish between logical data and physical data relating to a design. By way of further example and not by way of limitation, physical data may be expressed in a physical representation relating to the layout of elements of a design expression. By way of still further example and not by way of limitation, logical data may be expressed in a logical expression relating to the employment of elements of a design expression such as voltage carried by an electrical line or pressure applied to a hydraulic line.

Another example, not to be taken as a limitation, may be a computer program which may be constructed using Unified Modeling Language (UML), class diagrams, specifications (physical data) and computer code (logical data).

Figure 1:
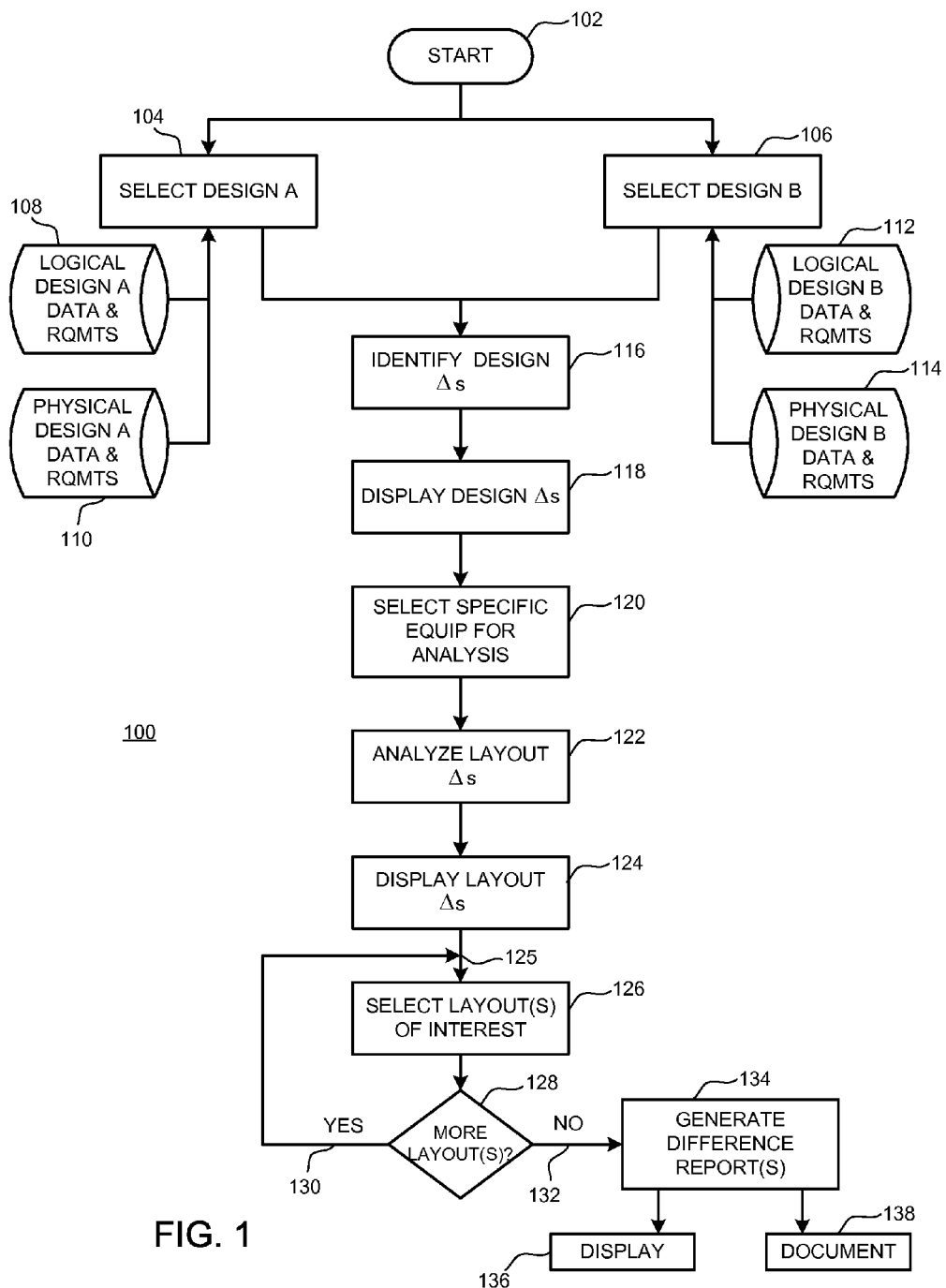
FIG. 1 is a flow chart illustrating the method of the present disclosure.

FIG. 1 is a flow chart illustrating the method of the present disclosure. In FIG. 1, a method for differentiating among a plurality of design expression such as installations of an apparatus or system may begin at a START locus 102. Method 100 may continue with digitally characterizing at least two aspects of a first installation of the plurality of installations, as may be embodied in selecting logical Design A digital logical data and requirements from a data store 108, and selecting physical Design A digital physical data and requirements from a data store 110, as indicated by a block 104.

For purposes of this disclosure, logical data and requirements relating to an installation may pertain to employment of the installation such as, by way of example and not by way of limitation, current carried on an electrical line or pressure applied to a hydraulic line. For purposes of this disclosure, physical data and requirements relating to an installation may pertain to layout or routing of an installation such as, by way of example and not by way of limitation, wiring harness or connection arrangements in an installation or hydraulic line routing and connection within an installation.

Method 100 may continue with digitally characterizing the at least two aspects of at least one next installation of the plurality of installations, as may be embodied in selecting logical Design B digital data and requirements from a data store 112, and selecting physical Design A digital data and requirements from a data store 110, as indicated by a block 104.

Method 100 may continue with identifying selected differences (indicated by Δ) between the at least two aspects of the first installation and the at least one next installation, as indicated by a block 116.

Method 100 may continue with displaying selected differences (indicated by Δ) between the at least two aspects of the first installation and the at least one next installation, as indicated by a block 118.

Method 100 may continue with selecting specific equipment in an apparatus for analysis, as indicated by a block 120.

Method 100 may continue with analyzing layout or physical differences (indicated by Δ) between selected designs, as indicated by a block 122.

Method 100 may continue with displaying layout or physical differences (indicated by Δ) between selected designs, as indicated by a block 124. Method 100 may continue with selecting layouts among the plurality of installations that may be deemed to be layouts of interest, as indicated by a block 126.

Method 100 may next present a query whether more layouts may be selected as layouts of interest, as indicated by a query block 128. If more layouts may be selected as layouts of interest, method 100 may proceed from query block 128 via a YES response line 130 to a locus 125. Method 100 may proceed from locus 125 via blocks 126, 128 as previously described herein.

If more layouts may not be selected as layouts of interest, method 100 may proceed from query block 128 via a NO response line 132 to generate difference reports regarding the layouts of interest, as indicated by a block 134. Reports may be presented in a video display, as indicated by a block 136, or may be presented in documentary form as indicated by a block 138. Reports may also be presented in other forms, such as in digital form on a Compact Disc-Read Only Memory (CD-ROM) or another form. The selected differences may be presented using at least one visually identifiable distinction. By way of example and not by way of limitation, visually identifiable distinction may be effected using different colors or by using a differentiated fill pattern.

By way of further example and not by way of limitation, the first installation and the at least one next variation may be presented in a manner in which the displaying is effected presenting the first installation and the at least one next installation substantially oriented with respect to common axes.

By way of another example and not by way of limitation, the displaying may be effected presenting the first installation and the at least one next installation each substantially oriented with respect to different axes displaced from each other.

By way of still another example and not by way of limitation, the displaying may be effected presenting one of the first installation and the at least one next installation in a front oriented installation and an other of the first installation and the at least one next installation in a rear situated installation presented further from a viewer than the front situated installation. The front situated installation may be sufficiently transparent to permit distinguishing the front situated installation and the rear situated installation.

Text regarding the first installation and the at least one next installation may each be presented in the display in a written form generally in the vicinity of the display.

Figure 2:
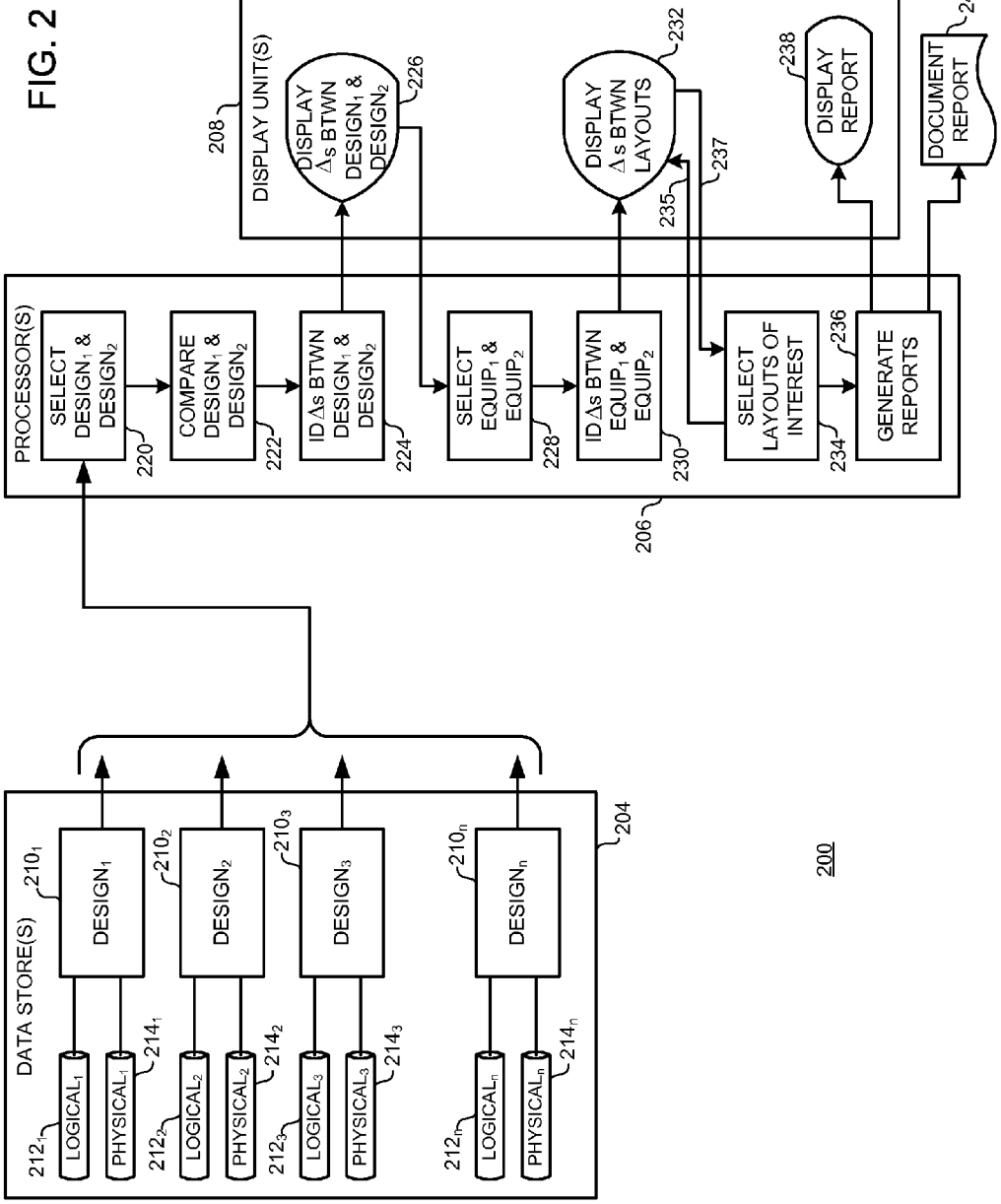
FIG. 2 is a schematic illustration of the system or apparatus of the present disclosure.

FIG. 2 is a schematic illustration of the system or apparatus of the present disclosure. In FIG. 2, a system 200 for differentiating among a plurality of design expression such as installations or variations of an apparatus may include data stores 204 coupled with processors 206 and display units 208.

Data stores 204 may be embodied in at least one data store storing information digitally characterizing at least two aspects of each respective installation of the plurality of installations. A first installation according to a $Design_1$ 210$_1$ may store digital information characterizing logical aspects of $Design_1$ in a data store 212$_1$, and may store digital information characterizing physical aspects of $Design_1$ in a data store 214$_1$.

As mentioned earlier herein, for purposes of this disclosure, logical data and requirements relating to an installation may pertain to employment of the installation such as, by way of example and not by way of limitation, current carried on an electrical line or pressure applied to a hydraulic line. For purposes of this disclosure, physical data and requirements relating to an installation may pertain to layout or routing of an installation such as, by way of example and not by way of limitation, wiring harness or connection arrangements in an installation or hydraulic line routing and connection within an installation.

A second installation according to a $Design_2$ 210$_2$ may store digital information characterizing logical aspects of $Design_2$ in a data store 212$_2$, and may store digital information characterizing physical aspects of $Design_2$ in a data store 214$_2$.

A third installation according to a $Design_3$ 210$_3$ may store digital information characterizing logical aspects of $Design_3$ in a data store 212$_3$, and may store digital information characterizing physical aspects of $Design_3$ in a data store 214$_3$. An nth installation according to a $Design_n$ 210$_n$ may store digital information characterizing logical aspects of $Design_n$ in a data store 212$_n$, and may store digital information characterizing physical aspects of $Design_n$ in a data store 214$_n$. The indicator "n" is employed to signify that there can be data stored regarding any number of installations in data stores 204. The storing of data regarding installation designs $Design_1$, $Design_2$, $Design_3$, $Design_n$ stored in four data stores 210$_1$, 210$_2$, 210$_3$, 210$_n$ in FIG. 2 is illustrative only and does not constitute any limitation regarding the number of installation designs that may be included in the data stores of the present invention.

Processors 206 may embody at least one processing unit coupled with data stores 204. Processors 206 may identify selected differences between at least two aspects (e.g., logical aspects and physical aspects) of a first design, for example $Design_1$. Processors 206 may also identify selected differences between at least two aspects (e.g., logical aspects and physical aspects) of a next design, for example $Design_2$. Processors 206 may select a first installation $Design_1$ and at least one next installation $Design_2$, as indicated by a block 220. Processors 206 may compare installations $Design_1$, $Design_2$, as indicated by a block 222. Processors 206 may identify differences (denoted by $\Delta$) between installations $Design_1$, $Design_2$, as indicated by a block 224.

Display units 208 may embody at least one display unit coupled with processors 206. Display units 208 may present the first installation (e.g., $Design_1$) and the at least one next installation (e.g., $Design_2$) in a visual display. Differences between $Design_1$ and $Design_2$ may be presented using at least one visually identifiable distinction. Processors 206 may cooperate with display units 208 to display differences between installations $Design_1$, $Design_2$, as indicated by a block 226.

Processors 206 may be employed to select particular equipments ($Equip_1$, $Equip_2$) associated respectively with installations $Design_1$, $Design_2$), as indicated by a block 228. Equipment $Equip_1$ may be a subset of installation $Design_1$. Equipment $Equip_2$ may be a subset of installation $Design_2$.

Processors may identify differences between equipments $Equip_1$, $Equip_2$, as indicated by a block 230.

Processors 206 may cooperate with display units 208 to display differences between layouts associated with equipments $Equip_1$, $Equip_2$, as indicated by a block 232. Processors 206 may select layouts of interest from among layouts displayed according to block 232, as indicated by a block 234. Display of layout differences (block 232) and selection of layouts of interest (block 234) may be performed in an iterative manner (indicated by arrows 235, 237) until all layouts of interest are selected (block 234).

Processors 206 may generate reports reflecting differences among layouts of interest selected according to block 234, as indicated by a block 236.

Processors 206 may cooperate with display units 208 to present the first installation (e.g., $Design_1$) and the at least one next installation (e.g., $Design_2$) in a visual display, as indicated by a block 238. Processors 206 may also generate a document (written) report, as indicated by a block 240.

Differences between $Design_1$ and $Design_2$ may be presented in the visual display or documentary reports using at least one visually identifiable distinction. By way of example and not by way of limitation, visually identifiable distinction may be effected using different colors or by using a differentiated fill pattern.

By way of further example and not by way of limitation, the first installation and the at least one next variation may be presented in a manner in which the displaying is effected presenting the first installation and the at least one next installation substantially oriented with respect to common axes.

By way of another example and not by way of limitation, the displaying may be effected presenting the first installation and the at least one next installation each substantially oriented with respect to different axes displaced from each other.

By way of still another example and not by way of limitation, the displaying may be effected presenting one of the first installation and the at least one next installation in a front oriented installation and an other of the first installation and the at least one next installation in a rear situated installation presented further from a viewer than the front situated installation. The front situated installation may be sufficiently transparent to permit distinguishing the front situated installation and the rear situated installation.

Text regarding the first installation and the at least one next installation may each be presented in the display in a written form generally in the vicinity of the display.

Figure 3:
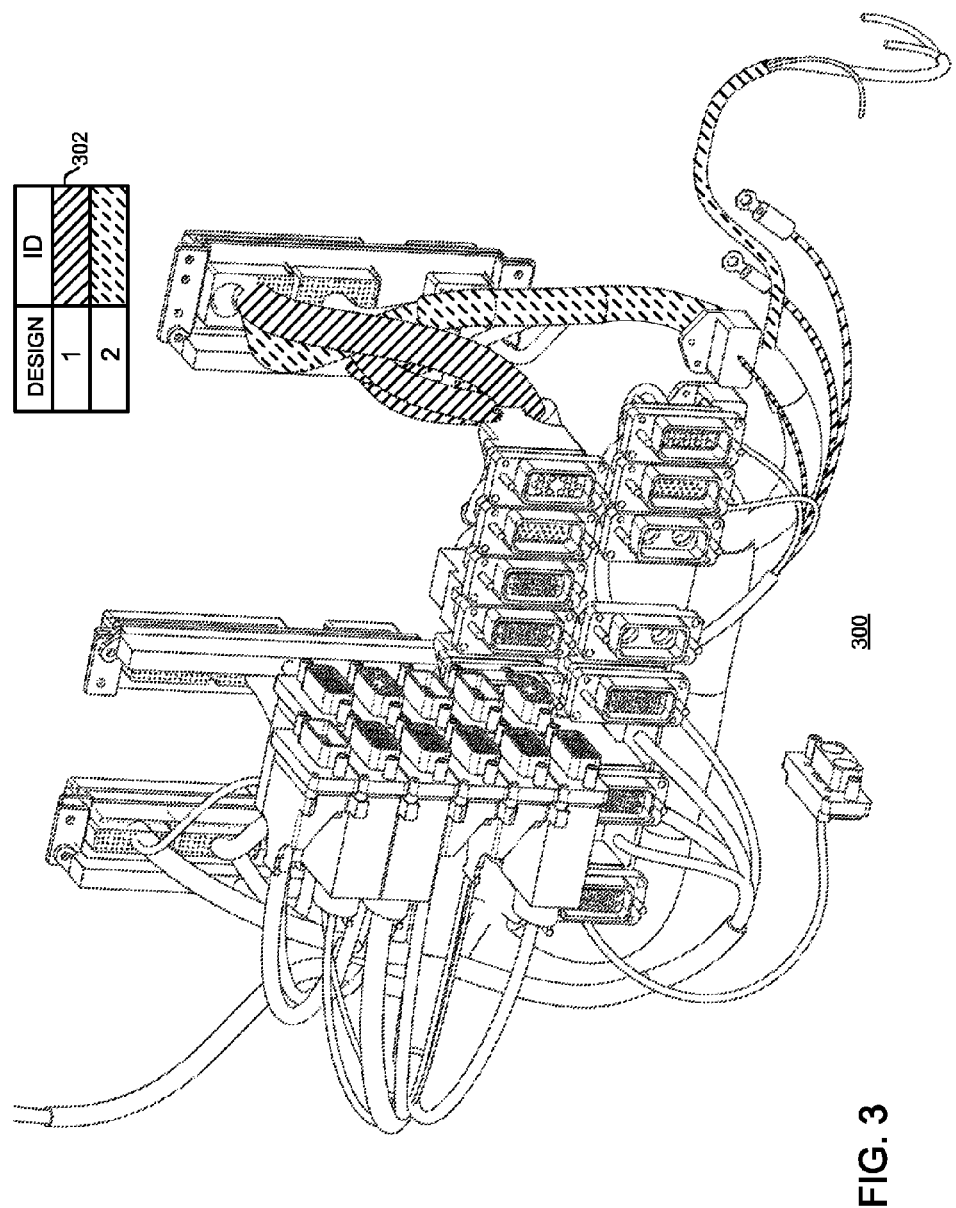
FIG. 3 is an exemplary illustration of a product of the method and system of the present disclosure produced for a user.

FIG. 3 is an exemplary illustration of a product of the method and system of the present disclosure produced for a user. In FIG. 3, an installation 300 may be illustrated having two layout arrangements. A table 302 may denote which layout may be associated with a particular cross-hatching scheme. The two cross-hatching schemes may be a solid cross-hatching pattern and an interrupted cross-hatching pattern. A first layout, designated as $Design_1$ may be indicated in FIG. 3 using a solid cross-hatching scheme, as indicated by table 302. A second layout, designated as Design may be indicated in FIG. 3 using an interrupted cross-hatching scheme, as indicated by table 302.

Displaying or otherwise presenting (e.g., in a printed document) differences between layouts of two installations $Design_1$, $Design_2$ using visually identifiable distinctions such as different cross-hatching schemes may permit ready understanding of those differences by personnel using the information. Thus, equipment installers, supervisory personnel and other personnel on a shop floor maybe straightforwardly apprised of differences among various installations or variations of a product to be manufactured.

Visually identifiable distinctions between layouts of two installations $Design_1$, $Design_2$ may be effected in other ways such as, by way of example and not by way of limitation, a color distinction, a differentiated fill pattern, presenting $Design_1$ and $Design_2$ substantially oriented with respect to common axes and presenting $Design_1$ and $Design_2$ substantially oriented with respect to different axes displaced from each other. $Design_1$ and $Design_2$ may be each presented in a written form generally in the vicinity of a graphic representation of $Design_1$ and $Design_2$, such as table 302, or in more detailed tabular listings of differences (not shown in FIG. 3; known to those skilled in the art of design expression development).

Displaying or otherwise presenting differences between layouts of two installations $Design_1$, $Design_2$ may be effected presenting one of the first variation and at least one of a next variation in a front-situated variation and an other of the first variation and the at least one of a next variation in a rear-situated variation presented further from a viewer than the front-situated variation. The front-situated variation may be sufficiently transparent to permit distinguishing the front-situated variation and the rear-situated variation.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A method comprising:
   using a processor to compare physical features of first and second installations of electrical wiring or hydraulics for an aircraft;
   displaying a graphical representation including those features that are common between the first and second installations; and
   including in the graphical representation those features that are different between the first and second installations, the different features coded to identify their corresponding installations.

2. The method of claim 1, wherein the graphical representation includes a common surface model of the common features and additional surface models of the different features.

3. The method of claim 1, wherein the processor also determines differences in logical data and includes those differences in the graphical representation.

4. The method of claim 1, wherein the first and second installations include electrical wiring installations.

5. The method of claim 4, wherein the first and second installations include first and second wiring harnesses.

6. The method of claim 1, wherein the first and second installations include hydraulics installations.

7. A system comprising a processor programmed to compare physical features of first and second installations of electrical wiring or hydraulics for an aircraft, display a graphical representation including those features that are common between the first and second installations, and include in the graphical representations those features that are different between the first and second installations, the different features coded to identify their corresponding installations.

8. The system of claim 7, wherein the processor is programmed to generate the graphical representation as a common surface model of the common features and additional surface models of the different features.

9. The system of claim 7, wherein the processor is further programmed to determine differences in logical data of the first and second installations, and include those differences in the graphical representation.

10. The system of claim 7, wherein the first and second installations include electrical wiring installations.

11. The system of claim 10, wherein the first and second installations include first and second wiring harnesses.

12. The system of claim 7, wherein the first and second installations include hydraulics installations.

* * * * *